US011278157B2

(12) United States Patent
Veltrop

(10) Patent No.: US 11,278,157 B2
(45) Date of Patent: Mar. 22, 2022

(54) FOOD TRAY

(71) Applicant: Marmon Foodservice Technologies, Inc., Osseo, MN (US)

(72) Inventor: Loren Veltrop, Chicago, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 426 days.

(21) Appl. No.: 16/361,562

(22) Filed: Mar. 22, 2019

(65) Prior Publication Data
US 2019/0290073 A1 Sep. 26, 2019

Related U.S. Application Data

(60) Provisional application No. 62/646,638, filed on Mar. 22, 2018.

(51) Int. Cl.
*A47J 45/06* (2006.01)
*G01G 19/52* (2006.01)
*A47J 43/28* (2006.01)

(52) U.S. Cl.
CPC .............. *A47J 45/068* (2013.01); *A47J 43/28* (2013.01); *G01G 19/52* (2013.01)

(58) Field of Classification Search
CPC .......... A47J 45/068; A47J 43/28; G01G 19/52
See application file for complete search history.

(56) References Cited

U.S. PATENT DOCUMENTS

| 4,388,689 A | 6/1983 | Hayman et al. |
| 4,530,067 A | 7/1985 | Dorr |
| 4,547,851 A | 10/1985 | Kurland |
| 4,553,222 A | 11/1985 | Kurland et al. |
| 4,569,421 A | 2/1986 | Sandstedt |
| 4,922,435 A | 5/1990 | Cahlander et al. |
| 5,003,472 A | 3/1991 | Perrill et al. |
| 5,093,556 A | 3/1992 | Oelfke |
| 5,128,862 A | 7/1992 | Mueller |
| 5,132,914 A | 7/1992 | Cahlander et al. |
| 5,172,328 A | 12/1992 | Cahlander et al. |

(Continued)

FOREIGN PATENT DOCUMENTS

| CN | 1691890 | 11/2005 |
| CN | 101355899 | 1/2009 |

(Continued)

OTHER PUBLICATIONS

Prince Castle LLC, DHB2PT-20 with MenuTrak Food Supervision System, https://web.archive.org/web/20020817034157/http://www.princecastle.com:80/products/DHB2PT-20.html, accessed Oct. 4, 2017.

(Continued)

*Primary Examiner* — Omar Flores Sanchez
(74) *Attorney, Agent, or Firm* — Andrus Intellectual Property Law, LLP

(57) ABSTRACT

A food holding tray and a system for holding prepared food items include a shell that defines at least one food receiving area internal to the shell. A plurality of sensors are arranged about the shell and directed into the food receiving area. A processor is communicatively connected to the plurality of sensors to receive signals from the sensors. The processor calculates holding data from the signals received from the sensors.

20 Claims, 7 Drawing Sheets

(56) References Cited

U.S. PATENT DOCUMENTS

| | | |
|---|---|---|
| 5,188,020 A | 2/1993 | Buchnag |
| 5,218,527 A | 6/1993 | Ishikawa et al. |
| 5,253,564 A | 10/1993 | Rosenbrock et al. |
| 5,357,426 A | 10/1994 | Morita et al. |
| 5,504,589 A | 4/1996 | Montague et al. |
| 5,510,979 A | 4/1996 | Moderi et al. |
| 5,539,671 A | 7/1996 | Albrecht et al. |
| 5,553,312 A | 9/1996 | Gattery et al. |
| 5,579,952 A | 12/1996 | Fiedler et al. |
| 5,590,586 A | 1/1997 | Ulfig et al. |
| 5,602,730 A | 2/1997 | Coleman, II et al. |
| 5,616,269 A | 4/1997 | Fowler et al. |
| 5,630,070 A | 5/1997 | Dietrich et al. |
| 5,653,906 A | 8/1997 | Fowler et al. |
| 5,712,958 A | 1/1998 | Landolt |
| 5,724,886 A | 3/1998 | Ewald et al. |
| 5,772,072 A | 6/1998 | Prescott et al. |
| 5,812,393 A | 9/1998 | Drucker |
| 5,832,446 A | 11/1998 | Neuhaus |
| 5,839,115 A | 11/1998 | Coleman |
| 5,845,263 A | 12/1998 | Camaisa et al. |
| 5,939,974 A | 8/1999 | Heagle et al. |
| 5,947,012 A | 9/1999 | Ewald et al. |
| 6,011,243 A | 1/2000 | Arnold et al. |
| 6,026,372 A | 2/2000 | Savage |
| 6,052,667 A | 4/2000 | Walker et al. |
| 6,088,681 A | 7/2000 | Coleman, II et al. |
| 6,119,587 A | 9/2000 | Ewald et al. |
| 6,209,447 B1 | 4/2001 | Ewald et al. |
| 6,445,976 B1 | 9/2002 | Ostro |
| 6,637,322 B2 | 10/2003 | Veltrop |
| 6,693,539 B2 | 2/2004 | Bowers |
| 6,959,862 B2 | 11/2005 | Neumark |
| 6,972,682 B2 | 12/2005 | Lareau et al. |
| 7,105,779 B2 | 9/2006 | Shei |
| 7,132,926 B2 | 11/2006 | Vaseloff et al. |
| D543,773 S | 6/2007 | Reckert et al. |
| D555,419 S | 11/2007 | Reckert et al. |
| D590,655 S | 4/2009 | Freeman |
| 7,696,869 B2 | 4/2010 | Brown |
| 7,905,173 B2 | 3/2011 | Sus et al. |
| 7,971,523 B2 | 7/2011 | Hartfelder et al. |
| 7,973,642 B2 | 7/2011 | Schackmuth et al. |
| 8,247,745 B2 | 8/2012 | Chung et al. |
| 8,522,675 B2 | 9/2013 | Veltrop |
| D696,057 S | 12/2013 | Green et al. |
| 9,003,820 B2 | 4/2015 | Veltrop |
| D752,864 S | 4/2016 | Levie |
| 9,746,842 B2 | 8/2017 | Reese et al. |
| D797,493 S | 9/2017 | Freeman |
| 9,976,750 B1 | 5/2018 | Kestner et al. |
| 9,980,322 B1 | 5/2018 | Kestner et al. |
| 10,020,199 B1 | 7/2018 | Bowers et al. |
| 2011/0017078 A1 | 1/2011 | O'Connell |
| 2017/0290466 A1 | 10/2017 | Lundberg et al. |
| 2018/0220841 A1 | 8/2018 | Patterson et al. |
| 2019/0075970 A1 | 3/2019 | Patterson et al. |
| 2020/0381107 A1* | 12/2020 | Lowry ............ G06Q 40/08 |
| 2021/0019532 A1* | 1/2021 | Calmus .......... G06K 9/00771 |
| 2021/0030169 A1* | 2/2021 | Zhai ............... G01G 19/52 |

FOREIGN PATENT DOCUMENTS

| | | |
|---|---|---|
| GB | 2203320 | 10/1988 |
| GB | 2206222 | 12/1988 |
| JP | 58108337 | 6/1983 |
| JP | 02056889 | 2/1990 |
| JP | 06259662 | 9/1994 |
| JP | 07296071 | 11/1995 |
| JP | 8000414 | 1/1996 |
| JP | 10079088 | 3/1998 |
| JP | 11342061 | 12/1999 |
| WO | WO 2013062832 A1 | 5/2013 |

OTHER PUBLICATIONS

Prince Castle LLC, DHB4PT-20 with MenuTrak Food Supervision System, https://web.archive.org/web/20020818222222/http://www.princecastle.com:80/products/DHB4PT-20.html, accessed Oct. 4, 2017.
Prince Castle Inc. Worldwide, DHB2PT-20 Series Dedicated Holding Bin Manual.
Prince Castle Inc. Worldwide, DHB2PT-27 Series Dedicated Holding Bin Manual.
Prince Castle Inc. Worldwide, DHB4PT-20 Series Dedicated Holding Bin Manual.
U.S. Appl. No. 14/850,914, Notice of Allowance, dated Oct. 16, 2017.
U.S. Appl. No. 14/850,921, Nonfinal Office Action, dated Aug. 23, 2017.
U.S. Appl. No. 14/850,937, Nonfinal Office Action, dated Sep. 13, 2017.
U.S. Appl. No. 15/160,748, Final Office Action, dated Aug. 24, 2017.
U.S. Appl. No. 14/850,914, Nonfinal Office Action, dated Feb. 23, 2017.
U.S. Appl. No. 15/160,748, Nonfinal Office Action, dated Mar. 23, 2017.
U.S. Appl. No. 14/850,944, Nonfinal Office Action, dated Jul. 6, 2017.
"Modular Holding Cabinets", Product Catalog, Carter-Hoffman, Mundelein, Illinois (Jan. 2014).
Alpha M.O.S. America, Inc., Flavor & Odor Analyzers, company product development and quality control data sheet.
MyRecipes.com: The Classic Burger (Jul. 2005). Retrieved from the Internet on Dec. 24, 2014, <http://www.mvrecioes.com/recipe/classic-burger>.
Chapter 7 Packaging Materials. FAO Corporate Document Repository. Apr. 15, 2009. Retrieved from: <https://web.archive.org/web/20090415222240/http://www.fao.org/docrepN5030EN5030EOh.htm>.
Lamberti et al. Aluminum Foil as a Food Packaging Material in Comparison with other Materials. Food Reviews International. Oct. 2007, vol. 23 Issue 4, p. 407-433. 001:10.1080/87559120701593830.
USPTO, Office Action for U.S. Appl. No. 13/326,607 dated Apr. 11, 2013.
USPTO, Office Action for U.S. Appl. No. 13/326,607 dated Sep. 12, 2013.
USPTO, Office Action for U.S. Appl. No. 13/326,607 dated Feb. 25, 2014.
USPTO, Office Action for U.S. Appl. No. 13/326,667 dated May 29, 2013.
USPTO, Office Action for U.S. Appl. No. 13/326,667 dated Aug. 7, 2013.
Office Action for Chinese Patent Application No. 201610812798.9, dated Jun. 15, 2020.

* cited by examiner

FOOD TRAY

CROSS-REFERENCE TO RELATED APPLICATIONS

The present application claims priority of U.S. Provisional Patent Application No. 62/646,638, filed on Mar. 22, 2018, the content of which is hereby incorporated by reference in its entirety.

BACKGROUND

The present disclosure relates to the field of restaurants or food preparation. More specifically, the present disclosure relates to a food tray with sensors to monitor the contents of the tray.

Various types of ovens or food warming units are used in the food industry. Such ovens and food warming apparatus allow precooked food items to be stored separately until needed. For instance, when a quick serve restaurant receives an order for a sandwich, the sandwich may be assembled on a food preparation table where the contents of certain sandwich items may be removed from food warming units. The storing of precooked food in food warming units enables quick assembly of the sandwich and efficient order fulfillment.

The conditions in which the cooked food are held play a significant role in the quality, palatability, and consumption safety of the precooked food. Inventory control of precooked food items can reduce the amount of precooked food held and the length of time that individual precooked food items are held. However, tighter inventory control requires more frequent cooking of smaller batches of food items. Increased tracking and knowledge of the held precooked food items in comparison to the number of ordered and/or expected food item needs are required.

SUMMARY

An exemplary embodiment of a food holding tray includes a shell that defines at least one food receiving area internal to the shell. A handle extends outward from the shell. A plurality of sensors is arranged about the shell and directed into the food receiving area. A processor is communicatively connected to the plurality of sensors to receive signals from the sensors. The processor calculates holding data from the signals received from the sensors. The processor operates to provide at least one indication of the holding data.

The food holding tray may further include holding data that includes a count of food items held within the at least one food receiving area. The sensors of the food holding tray may include at least one emitter and at least one collector of light wavelength energy. The processor may calculate the count of food items from a monitored height of food items in the at least one food receiving area. The at least one indication provided by the processor may include a visual indication on the food holding tray and a transmission of the count of food items broadcast by a wireless communication device connected to the processor. At least one graphical display is operable by the processor to present the visual indication. A user input device may be operable to receive an input of an identification of a type of food item within the at least one food receiving area.

In exemplary embodiments of the food holding tray, the holding data may include environmental data of an environment of the food receiving area. A wireless communication device may be connected to the processor and the wireless communication device is operated by the processor to broadcast the holding data. In an embodiment of the food holding tray, the shell is an inner shell the food holding tray also includes an outer shell defining a space between the outer shell and the inner shell. The plurality of sensors, the processor, and the wireless communication device may be disposed between the inner shell and the outer shell. The plurality of sensors, the processor, and the wireless communication device may be disposed interior the handle. The food holding tray may include a handle housing securable to the handle, and the plurality of sensors, the processor and the wireless communication device may be disposed interior the housing.

In an exemplary embodiment of a system for holding prepared food, the system includes a food holding tray. The food holding tray includes a shell that defines at least one food receiving area internal to the shell. A handle extends outward from the shell. A plurality of sensors is arranged about the shell and directed into the food receiving area. A processor is communicatively connected to the plurality of sensors to receive signals from the sensors. The processor calculates holding data from the signals received from the sensors. The processor operates to provide at least one indication of the holding data. The system also includes a food holding chamber. The food holding chamber includes a food holding compartment that is configured to receive a plurality of food holding trays. At least one heat source is arranged relative to the food holding compartment. The food holding chamber includes a wireless communication device that is operable to receive the holding data broadcast from the wireless communication device. The food holding chamber includes a processor that receives the holding data from the wireless communication device and controls an operation of the food holding chamber based upon the received holding data.

Embodiments of the system for holding prepared food may include holding data that includes environment data of the food receiving area. The processor may operate the at least one heat source based upon the received holding data. The food holding chamber may include a plurality of illumination devices arranged about the food holding compartment. The holding data may include a count of food items in the food receiving area. The processor operates the plurality of illumination devices to provide an indication of the count of food items.

Embodiments of the system for holding prepared food may include a kitchen management system (KMS) that operates on a processor communicatively connected to the food holding tray and to the food holding chamber. The KMS receives the holding data from the food holding tray or the food holding chamber. At least one graphical display is in communication with the KMS. The graphical display operates to present the holding data. A location of the food holding tray may be determined based upon data broadcast by the wireless communication device. The KMS receives the location and tracks the location of the food holding tray.

Embodiments of the system for holding prepared food may further include a loading dock. The loading dock may be arranged proximate to a cooking apparatus. The loading dock may include a scale and a wireless communication device. The food holding tray may rest on the loading dock while the food holding tray is filled with food items from the cooking apparatus. The loading dock calculates a weight of the food items and provides the calculated weight to holding tray through the wireless communication devices and the processor of the tray uses the weight to calculate a count of food items as holding data. In embodiments of the system for holding prepared food, the holding data may include a count of food items in the food receiving area and environment. The food holding tray may include a user input device operable to receive an identification of a food type received in the food holding area. The processor of the food holding chamber receives the identification from the food holding tray. The processor of the food holding chamber operates the at least one heat source based upon the identification, the count of food items, and the environment data.

DETAILED DISCLOSURE

Exemplary embodiments of food holding trays and systems for food holding are disclosed herein that provide improved tracking of a type and/or a number of precooked food items held within the food trays. Additional embodiments as disclosed herein further provide environment data relative to the specific environment within an individual tray. In still further embodiments, food holding systems use this inventory and/or environmental data to provide improved food warming device operation and control to prolong food quality, palatability, and safety. Still further exemplary embodiments may provide improved inventory management through coordination of custom orders, food cooking, held precooked food inventory, and customer order assembly instructions.

Figure 1:
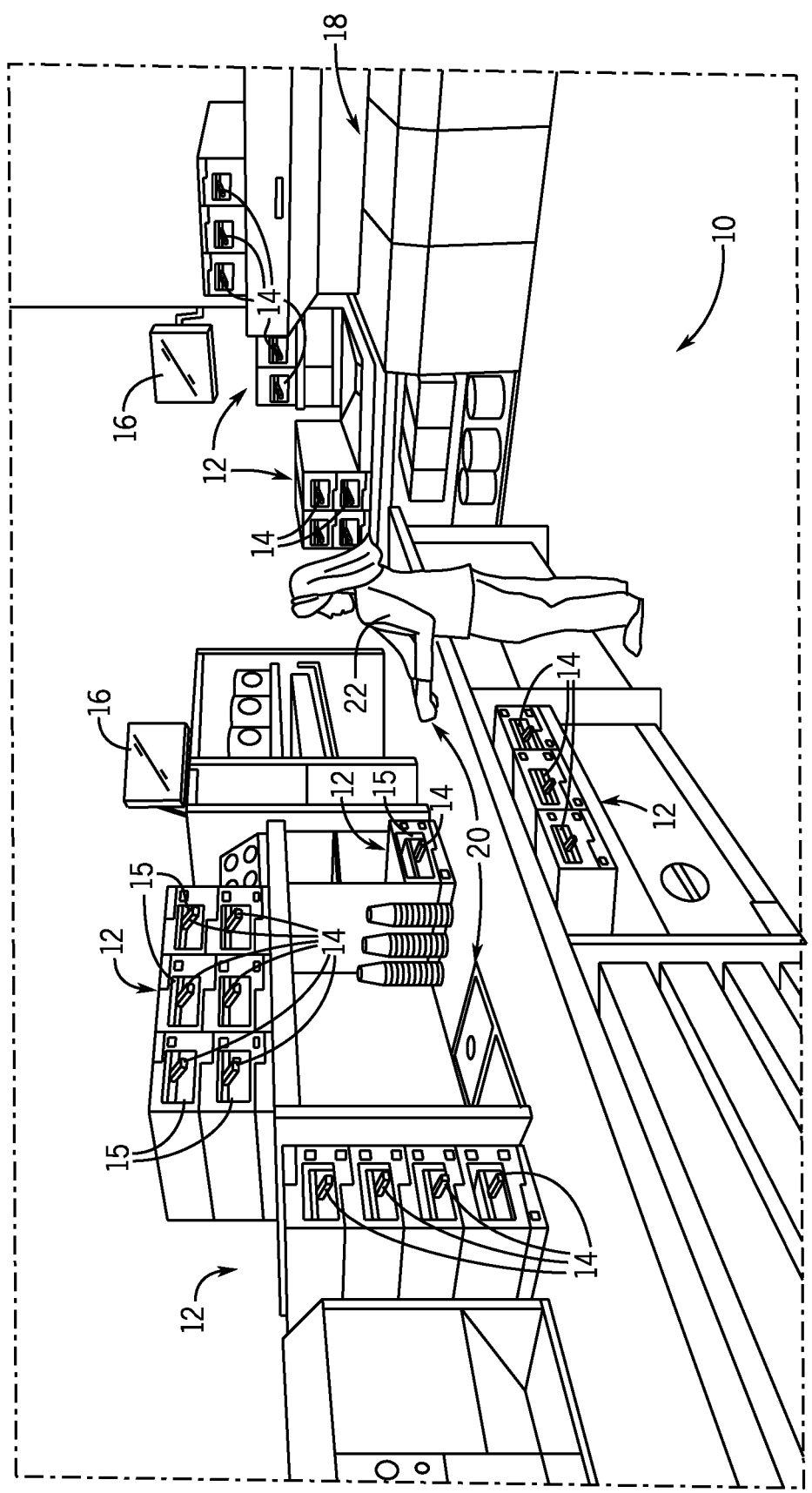
FIG. 1 is an environmental view of an exemplary kitchen.

FIG. 1 depicts an exemplary view of a kitchen 10, for example as found in a quick service restaurant. The kitchen 10 includes a variety of food holding chambers 12 positioned within the kitchen 10 relative to various preparation areas. The food holding chambers 12 are configured to receive one or more tray 14 within a compartment 15. The trays 14 are configured to hold a cooked food product therein. The compartments 15 are configured to receive one or more trays 14 within each compartment 15. The food holding chamber 12 includes heating elements and or other environmental control devices, for example, fans or humidifiers, in association with the compartments 15 which are operable to change the environment within the compartment 15. Interaction between the tray 14 and the food holding chambers 12 maintain an environment about the cooked food product within the tray 14 to prolong and preserve food quality, palatability, and safety.

In an exemplary embodiment, graphical displays 16 may be located and/or orientated within the kitchen 10 for the display of food order information, and/or information regarding the status of the tray 14, and/or the food held within trays 14. In an exemplary embodiment, the kitchen 10 includes a grill 18, for example at which the food items stored within the trays 14 are cooked. It will also be recognized that the grill 18 may be any of a number of food cooking apparatuses, including, but not limited to grills, broilers, fryers, or steamers as may be used to prepare a food item for consumption. A customer order is assembled from one or more previously cooked food items held in a tray 14.

Figure 2:
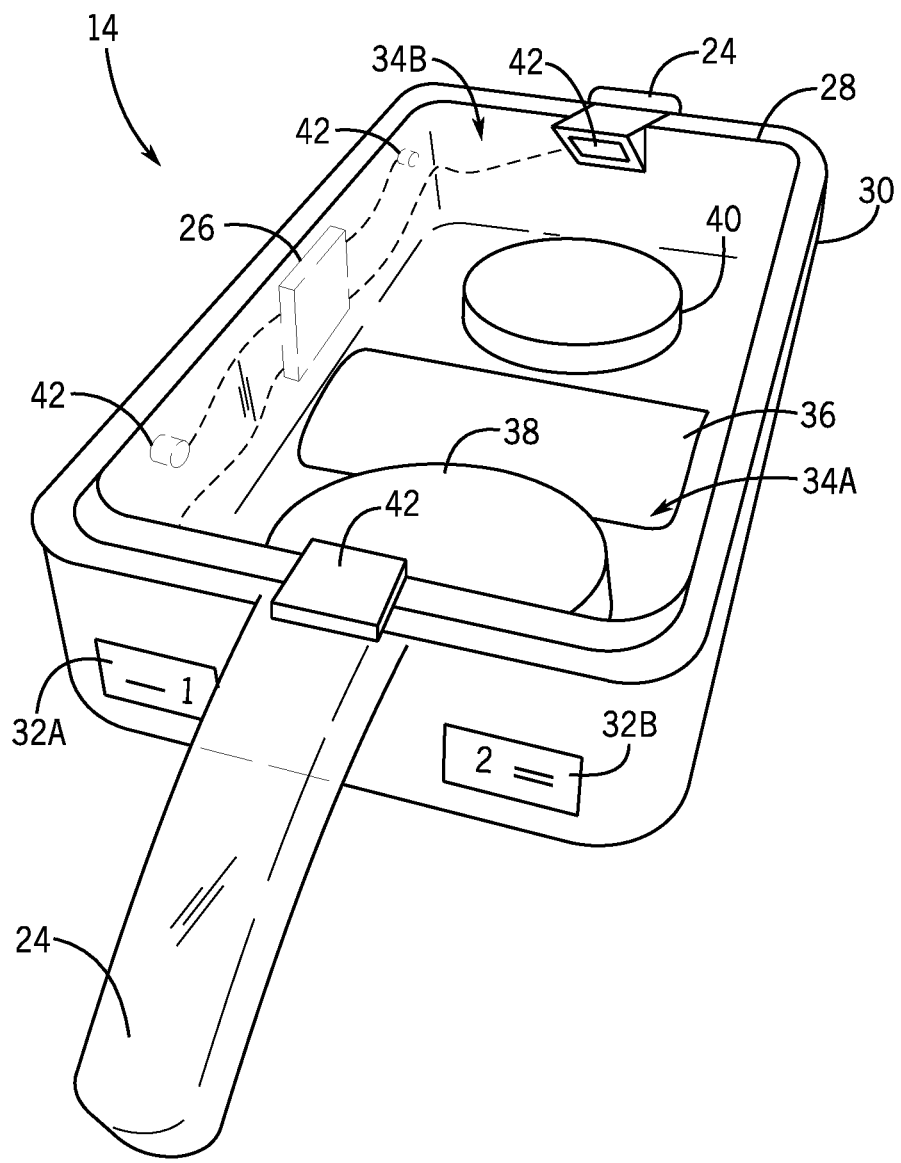
FIG. 2 is a perspective view of an exemplary embodiment of a tray.

FIG. 2 depicts an exemplary embodiment of a food tray 14 as will be described in further detail herein. The food tray 14 is exemplarily configured to include two handles 24, one disposed at either of opposed ends of the tray 14. In such an embodiment, this facilitates the use of the tray 14 with a two-sided food holding chamber wherein the tray 14 can be removed from either side to facilitate two lines or stations of food preparation.

The tray 14 further includes a processor 26. In exemplary embodiments, the processor is any of a variety of known controllers or microcontrollers and includes computer readable media or is communicatively connected to computer readable media such that the processor may access computer readable code stored on the computer readable media. Upon access and execution of the computer readable code, the processor operates to receive the inputs and perform the operations and controls as described in further detail herein.

The processor 26 is further connected to one or more types of sensors disposed within the tray 14. In an exemplary embodiment, the tray 14 is constructed of an inner shell 28 and an outer shell 30. A space formed between the inner shell 28 and the outer shell 30 provide an area to accommodate the processor 26, any sensors as described in further detail herein, and at least a portion of displays 32, as well as any other electronics as described in embodiments herein as well as any wired or electrical and/or communicative connections between the components as described.

The inner shell 28 of the tray 14 is exemplarily configured to define a food receiving area 34. At least one divider 36 may be disposed within the tray 14 to define two or more food receiving areas, exemplarily food receiving area 34A and food receiving area 34B. Each of the food receiving areas 34A, 34B may receive the same type of food or different types of food may be held within the different food receiving areas 34A, 34B. In the embodiment depicted in FIG. 2, one quarter pound hamburger patties 38 are held in food receiving area 34A while one eighth pound hamburger patties 40 are held in food receiving area 34B. However, it will be recognized that in other uses or embodiments any of a variety of other types of food items may be held within the tray 14. This may include, but is not limited to, fish fillets, chicken patties, chicken breasts, eggs, chicken nuggets, sausage patties, bacon, Canadian bacon, ham, or chicken tenders, or any other of a variety of food items as a person of ordinary skill in the art would recognize as being on a quick service restaurant menu.

The tray 14 further includes one, if not more, sensors 42 associated with each of the one or more food receiving areas 34. The sensors may be located between the inner shell 28 and the outer shell 30 or may be located internal to the inner shell 28 within the food receiving area 34. While a variety of embodiments of sensors will be described in the present application, in one embodiment, the sensors 42 are configured for the determination of a number of the food items within a food receiving area 34. The sensors may also be configured for determining the environmental conditions, for example, temperature and/or humidity, within the food receiving area 34. In embodiments, the sensors 42 may be time of flight sensors, which exemplarily use infrared or another wavelength of energy which may be or may not be visible light, to measure a length of time that it takes for the emitted energy to reflect off of the food objects in the food receiving area 34 and return to a collector. From this time, a distance between the food product and the sensor can be determined. This can be translated to a height of the food items in the food receiving area. If the dimensions of the food items are known, a count of the food items may be calculated from the calculated height. In other embodiments, multiple time of flight sensors may be used to improve result accuracy. The multiple time of flight sensors may be located at different positions, locations, or angles of orientation relative to the food receiving area 34. In still further exemplary embodiments, other forms of sensors may be used alone or in combination with the described time of flight sensors to produce a count of the food items in the food receiving area 34. Embodiments may include any of a variety of sensors or combination of sensors to perform these operations, including, but not limited to beam disruption sensors, sensors incorporating lasers or other forms or wavelengths of electromagnetic energy, RADAR, LIDAR, or SONAR-based sensors. In still further exemplary embodiments, one or more cameras may capture images of the receiving area and image processing techniques applied to the captured images to identify and count a number of food items in the receiving area.

The processor 26 receives the signals from the sensors 42 and processes such signals in order to produce holding data. The holding data can include environmental data and/or count data. Sensors adapted to provide an indication of a count of the food items in each of the food receiving areas 34 may include those sensors as described above and/or sensors that provide an indication of a height, a volume, and/or a weight of the food items in a food receiving area. In embodiments, at least one such sensor may be arranged relative to each food receiving area 34A, 34B in the tray 14. In exemplary embodiments, after determining the count of food items in a receiving area, the processor 26 operates graphical displays 32 to present the calculated remaining number of food items in the food receiving areas 34. For example, display 32A presents a count of the number of quarter-pound hamburger patties 38 positioned within the food receiving area 34A while display 32B presents a count of the number of one eighth pound hamburger patties 40 located within the food receiving area 34B. The processor 26 may provide the count and the operational commands to the displays 32A, 32B to present these counts accordingly.

As noted above, the sensors 42 may include one or more cameras (not depicted) incorporated into the tray 14 such that the one or more cameras are operable to capture images of the interior of the tray 14, including the one or more food receiving areas 34. The processor 26 may apply image recognition software, algorithms, and/or techniques to the captured images of the interior of the tray 14 in order to provide a count of the food items within the one or more food receiving areas 34 of the tray 14. In exemplary embodiments, this may be used with regularly shaped and generally stacked food items, for example, hamburger patties, chicken patties, eggs prepared in egg rings, or sausage. In other exemplary embodiments, irregularly shaped food items, or example chicken nuggets, chicken tenders, fried eggs, chicken breasts, or bacon may be identified through image recognition processing that may identify edges of objects in the captured images and use plyometric data to extrapolate a count of food items arranged in a pile or irregular stack where parts or all of food items may be obscured in the captured images. For example, such calculations may include the determination of a volume of the identified pile or irregular stack and the subsequent use of this volume information in combination with a known expected volume of the food items and the count of food items identifiable in the captured images.

It will further be recognized that in embodiments, in order for the processor to produce accurate counts of the food items in the food receiving areas 34, the processor 26 may need access to an identification of the type of food item expected to be located in the food receiving area 34. In an embodiment, the identification of the food product may be discovered, for example by further image processing as described above in embodiments wherein a camera captures images of the food receiving area 34.

In other embodiments, the identification of the type of food of the received food items may be input into the processor 26 of the tray 14 by a user input received through a user input device, for example, one or more buttons (not depicted) located on the tray 14, or touch-sensitive inputs incorporated into one or more displays 32 to input a food product selection. In other embodiments, a barcode reader, RFID reader, radio frequency RF transmitter or receiver or another wireless communication device in the tray may be used by a worker to input the identification of the food product, for example by way of communicative connection to another device such as a computer or smartphone. In still further exemplary embodiments, the tray 14 may include a wireless communication transmitter and/or receiver and an identification of a food item held in the tray 14 may be directed to the tray 14 through a kitchen management system or other wireless communication system operating within the kitchen or restaurant to coordinate operation between food preparation or handling devices as well as to coordinate worker performance of food assembly tasks. In still further exemplary embodiments, analysis of the time of flight data may be used to discover and identify the food items in the food receiving area, if the size and shapes of the food items are distinctive and distinguishable from one another. In still further embodiments, a scale incorporated into the tray 14 and/or incorporated as part of a tray loading station as will be described in further detail herein, may assist in food product identification discovery with additional information of the weight of the cooked food items.

It will be recognized that embodiments of the tray 14 as described herein may require one or more sources of power or electrical energization. Embodiments of the tray 14 may include but are not limited to, batteries, rechargeable batteries, or power supply connections. Power may be provided to the tray to operate the sensors 42, processor 26, displays 32, wireless communication devices, and/or to charge or recharge a battery for later operation of the tray 14. The power may be delivered to the tray 14 in the form of wireless power transmission, for example through the use of magnetic fields, induction, or radio waves while in other embodiments, mechanical connection, for example, electrical contacts, pins, cords, or plugs may be used to provide power to electrical components of the trays 14. In still further exemplary embodiments, a thermal electric generator, for example, a device that converts heat flux directly into electrical energy through a phenomenon called the Seebeck effect, or another conversion process may be incorporated into the tray 14 and used as a power source. In such embodiments, the tray 14 may generate power with the thermal electric generator due to the heat provided by the food holding chamber 12 within which the tray 14 is placed.

Still further exemplary embodiments of the tray 14 may include additional sensed data, control options, or further reported information, as well as additional communication to and from other devices and/or monitors within a kitchen 10, or for example a kitchen management system (KMS) configured to process and coordinate communication between devices and/or monitors within a kitchen. In such embodiments, the tray 14 may include a wireless transmitter/receiver so as to wirelessly communicatively connect the processor 26 to a computer or computers of the KMS. The processor 26 may receive instructions from the KMS as to what kind of food product is to be held in that tray 14, and any associated operating instructions associated with holding that kind of food product. It will be recognized that various combinations of the features as described herein may be used in embodiments of the present disclosure while not all specific combinations of features may be independently mentioned.

In additional embodiments of the tray 14, the displays 32 may be located on or at both ends of the tray 14 while in another embodiment, only a display 32 associated with the closest food receiving area 34 within such tray is presented on that side. While the displays 32 are depicted as located on the outer shell 30, it will be recognized that in other embodiments, the display 32 may be located on or in the handle 24.

In embodiments, the processor 26 may operate a timer to count or otherwise track a length of time that particular food items have been held within the tray 14 and within a specific food receiving area 34 of the tray 14. Additionally, the tray 14 may include other forms of sensors, for example, temperature sensors, humidity sensors, and/or an electronic nose chemical content sensor to from which the processor produces environment data about the food receiving area and enables further monitoring the condition of the environment within the tray 14.

Figure 3:
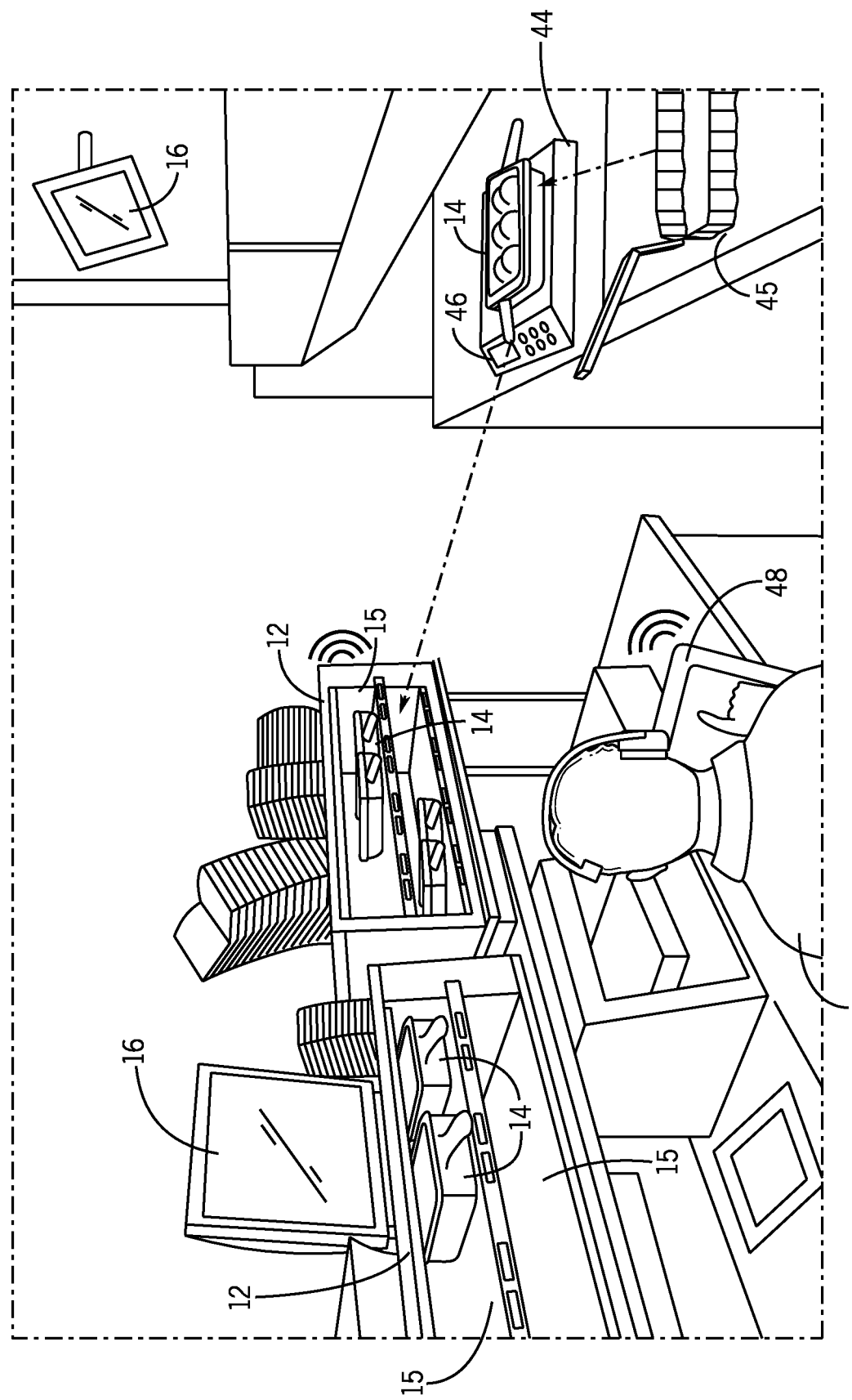
FIG. 3 is an environmental view of a kitchen with a holding system.

FIGS. 3-6 provide depictions and details of additional exemplary embodiments of food holding trays and food holding systems using trays as described herein. In FIG. 3, an exemplary embodiment of a food holding system is shown wherein the trays 14 maintain the sensing and food product tracking at locations independent from the food holding chamber 12. For example, the tray 14 operates as described above in an embodiment to identify food items and/or to provide a count of food items stored within the tray 14. Additionally, the tray 14 may track and maintain a temperature of the food receiving area 34 of the tray 14 as well as include a clock to provide a time stamp tracking of the temperature and number of food items over time.

In the embodiment depicted in FIG. 3, the tray 14 may operate to identify the number of food items loaded into the tray and further may track a time and/or a temperature of the food tray, including when the tray is outside of the food holding chamber 12. In an embodiment, the tray 14 may process temperature data and/or temperature trend data to determine if, and for how long, the tray 14 is outside of the food holding chamber 12. In a still further embodiment, the tray 14 may report back to the food holding chamber 12 and/or the KMS such that a location of the tray 14 within the kitchen is recorded and known. This tray location may be either reported on the food holding chamber 12 in the event that a tray is not located in the food holding chamber, or may be presented on one or more graphical displays 16 positioned around the kitchen 10.

In still further exemplary embodiments, the tray 14 may be loaded with food product in connection with a loading dock 44. The loading dock 44 may be exemplarily positioned near a food cooking apparatus 45, exemplarily a grill or a deep fryer. In an embodiment, the loading dock 44 includes a scale that can provide weight data as a food product is loaded into the tray 14. The weight data can assist to help to provide an initial count of the food items loaded into the tray 14. The loading dock 44 may also include an interface 46 whereby a worker may identify the food product being placed in the tray 14. The loading dock 44 may then communicate this identification of the food product to the tray 14 for example, with a wireless signal between the loading dock 44 and the processor 26 of the tray 14, for example through the wireless communication device of the tray 14 as described above. In other exemplary embodiments, the tray 14 may include a writable RFID tag to which the loading dock 44 may write an identification of the food product. In other embodiments, the loading dock 44 may communicate indirectly with the tray 14, for example through the KMS. As shown in FIG. 3, tray 14 is loaded with cooked food items, for example at the loading dock 44. As explained above in the loading process, the tray receives and/or determines an identification of the cooked food items. The tray 14 also obtains, through input or determination in any of the manners as described above, a count of the cooked food items in the tray 14. The tray 14, filled with cooked food items, is transferred to a holding chamber 12. With this information stored in the tray 14, placement of the tray 14 into a holding chamber 12 can be the input of food item type and/or food item count into the holding chamber 12 as this information is wirelessly communicated from the tray 14 to the holding chamber 12. The holding chamber 12 may operate to use such information to control the environmental conditions provided by the holding chamber 12 around the tray 14 held therein.

When implemented with wireless communication capability, the trays 14 can serve as the display and/or input component for interaction with the food holding chambers 12. In an embodiment, this may eliminate the need for buttons, user interfaces, and/or graphical displays on the food holding chambers 12. In a still further exemplary embodiment, a food service worker 22 may interact with the trays 14 and/or the food holding chambers 12 for example with a remote user interface 48 which may exemplarily be a tablet computer or another computer interface for the KMS. In exemplary embodiments, this may present an advantage in food holding systems as the graphical display, user interface, and other electronics may be able to be positioned away from the heat and/or the heat sources of the food holding chamber 12, and the food particle contamination associated with the immediate proximity of the food holding chamber 12 which may result in a more energy efficient and durable food holding chamber design.

In another exemplary embodiment, when the holding data, including, but not limited to a count of the food item, an identification of the food item, and an environmental condition within the food receiving area of the tray 14 is provided from the tray to the food holding chamber 12, the food holding chamber 12 may be operate wherein any tray 14 can be placed within any holding position of a compartment 15 of the food holding chamber 12 and communication between the tray 14 and the food holding chamber 12 can facilitate the operation of the food holding chamber in a manner such as to provide the appropriate operation to hold the food in that specific tray 14 in that holding position.

Figure 4:
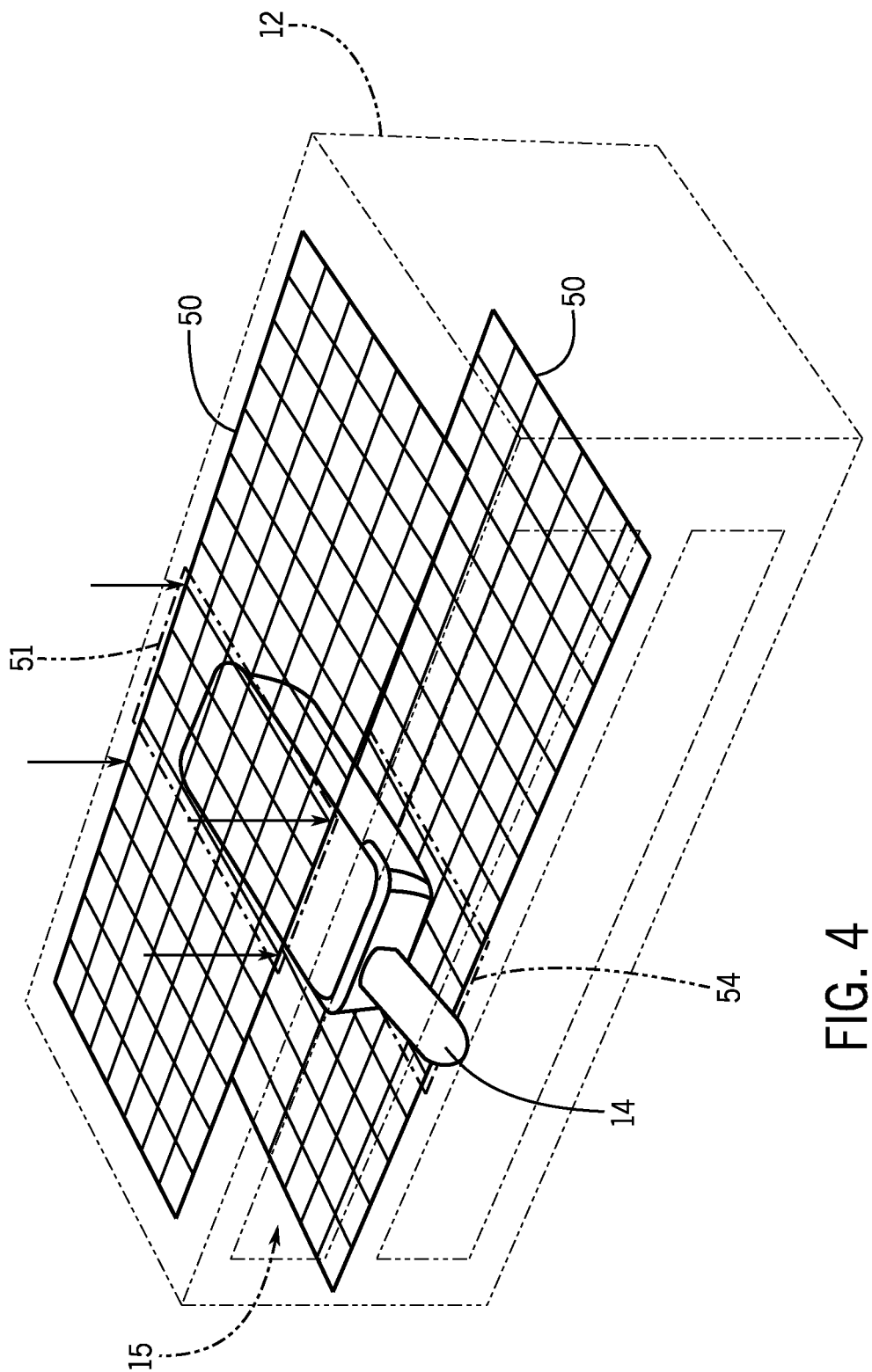
FIG. 4 depicts a holding system with visual indications.

In FIG. 4, the food holding chamber 12 may be constructed with heat sources 50 which include a plurality of elements in an array or arrangement to provide controllable heat delivery within a compartment 15 of the food holding chamber 12. The heat sources 50 may be located both above and below compartment 15. These heating elements of these heat sources 50 may exemplarily include, but not be limited to infrared or electric heating elements; these heating elements may include, but are not limited to ceramic, piezoelectric, or LED heating elements. In still further embodiments, the food holding chamber 12 may be constructed with heat sources 50 which employ inductive, conductive, and/or radiant heat transfer. In an inductive embodiment, the tray 14 may include an inductive material or element that converts electromagnetic energization provided by one or more inductive energy coils into heat energy in the tray 14. Still further exemplary and non-limiting embodiments may include the heating systems as disclosed in Applicant's U.S. Pat. No. 8,522,675 or U.S. Pat. No. 9,980,322 which are incorporated herein by reference in its entirety. In an embodiment, communication between the tray 14 and the food holding chamber 12 may result in an identification of the location of the tray 14 relative to one or more heating elements of the array whereby food holding chamber 12 operates to create an active heat zone area 51 with the associated one or more heating elements of the heat sources 50 relative to the location of the tray 14. The holding chamber 12 operates to activate and control the heating elements of the array associated with the position of the tray 14 in the active heat zone area 51. The particular location of the tray 14 may be determined based upon measurement of, for example, RF signals, between the tray and the holding chamber 12, including triangulation techniques. In other embodiments, a beacon or other detectable signal may be transmitted from one of the holding chambers 12 or tray 14 to the other to denote a location of the tray. In this manner, a single food holding chamber 12 may be used to hold multiple sized trays on demand as the trays are inserted into the food holding chamber 12, and different active heat zone areas 51 are established by operation of the holding chamber 12. The food holding chamber 12 may further operate to provide different holding environmental conditions to separate trays 14 by operating heating elements of the array to create multiple active heat zone areas 51 within either a holding chamber 12 or within a compartment 15 to create different environments according to the information provided by a specific tray 14.

Figure 5:
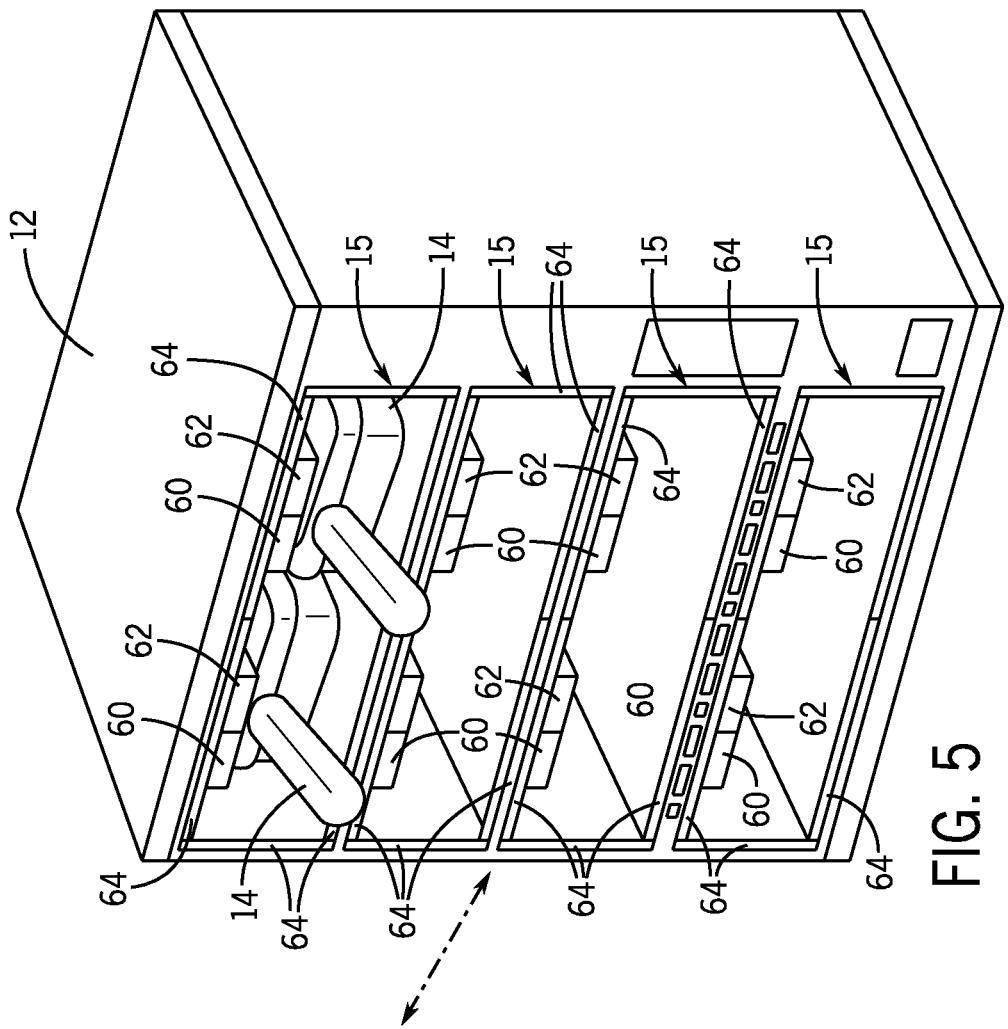
FIG. 5 depicts a holding system with active heat zones.

FIG. 5 provides an exemplary arrangement of a system that includes the food holding chamber 12 and a plurality of trays 14 as described herein. In an exemplary embodiment, the food holding chamber 12 further includes at least one sensor 60 arranged at a location within the food holding chamber 12, and exemplarily proximate to the opening of the food holding chamber 12. The sensor 60 may include any of the sensors as previously described above. The sensor 60 exemplarily operates as described above to provide a processor, for example, a processor associated with the holding chamber 12 with a count of the food items in a tray 14 arranged in proximate relation to the sensor 60. In this manner, the food holding chamber 12 may operate to provide this food product count as described above. In a still further embodiment, the sensor 60 may also operate to detect motion of the tray 14, whereby the system, including the processor, can track tray movement events and record a count of such events. Furthermore, upon detection of a tray movement event, the system may operate to perform a new determination of food product count as it may be expected that the food product count has decreased due to a worker removing at least one food product from the tray during the tray movement event. In still further exemplary embodiments, the sensor 60 may additionally obtain environmental data regarding, for example, the temperature and/or humidity within the tray 14.

The holding data sensed by the tray 14 may be used to operate the food holding chamber 12 and/or a graphical display to provide further inventory indication. For example, a combination of the remaining count of food items within the tray, the length of time as tracked by the tray 14 since the tray was loaded with food items, and/or any environmental conditions within the tray, for example temperature and/or humidity within the tray may be used to indicate which trays have food that is suitable for delivery to the customer while also indicating those trays that contain food that must be replaced. In an exemplary embodiment, communication between the tray 14 and the food holding chamber 12 may provide this information to the food holding chamber 12 and the food holding chamber 12 may operate to illuminate a region on or near the tray 14 to provide an indication either if the tray contains usable food (e.g. a first color) or food that should be replaced or refilled (e.g. a second color). In a merely exemplary embodiment, green illumination may be used to identify food that is good to serve to the customer while red illumination may be used to identify trays in which the food items should be replaced. In an exemplary embodiment, third yellow illumination may be used to identify food that has low inventory in the tray 14 but is still deemed to be good for delivery to the customer. A determination of whether or not food is good for delivery to the customer may be made upon a total length of time that the food product has been held and/or the environmental conditions monitored within the tray 14 itself.

The food holding chamber 12 may include lights 62 on or about the food holding chamber 12 to provide such indications. The illumination may be provided by lights 62 that are directed into the compartment 15. The lights 62 illuminate that portion of the compartment 15 that is associated with the associated tray 14, for example in the colors as described above to provide indications of the food consumption status. In another example, lights 64 may be provided on the external frame of the holding chamber 12 about the compartment 15. The lights 64 may exemplarily be LED piping in the area associated with each holding tray 14.

This illuminated indication of the status of the contents of each holding tray 14 may be also represented on the graphical displays 16 located in one or more places about the kitchen. In an exemplary embodiment, one graphical display may be positioned on or near the food holding chamber 12 while another communicatively connected graphical display 16 may be positioned in the vicinity of a cooking apparatus, for example, a deep fryer or grill. In such a manner, the cook may be presented with the remaining quantities of food items in each of the trays and/or a relative quality (e.g. if food product must be replaced) as reported and determined by the trays 14. The cook can plan accordingly to prepare more of the food needed to replenish the held food as reported by the trays 14. As previously described, the status information of the food in the trays 14 may be provided directly from the trays themselves, from the holding chamber 12, or communicated to the displays through the KMS. The graphical displays 16 may also present further information, for example, an indication of the type of food held in each tray, the actual count of remaining food items in the tray, and/or a clock of the elapsed time that the tray has been held. A combination of one or more of these types of visual presentations of the information can enable the removal of graphical displays from the holding chamber 12 altogether, which may enable a more energy efficient and/or durable construction of the holding chamber 12.

Figure 6:
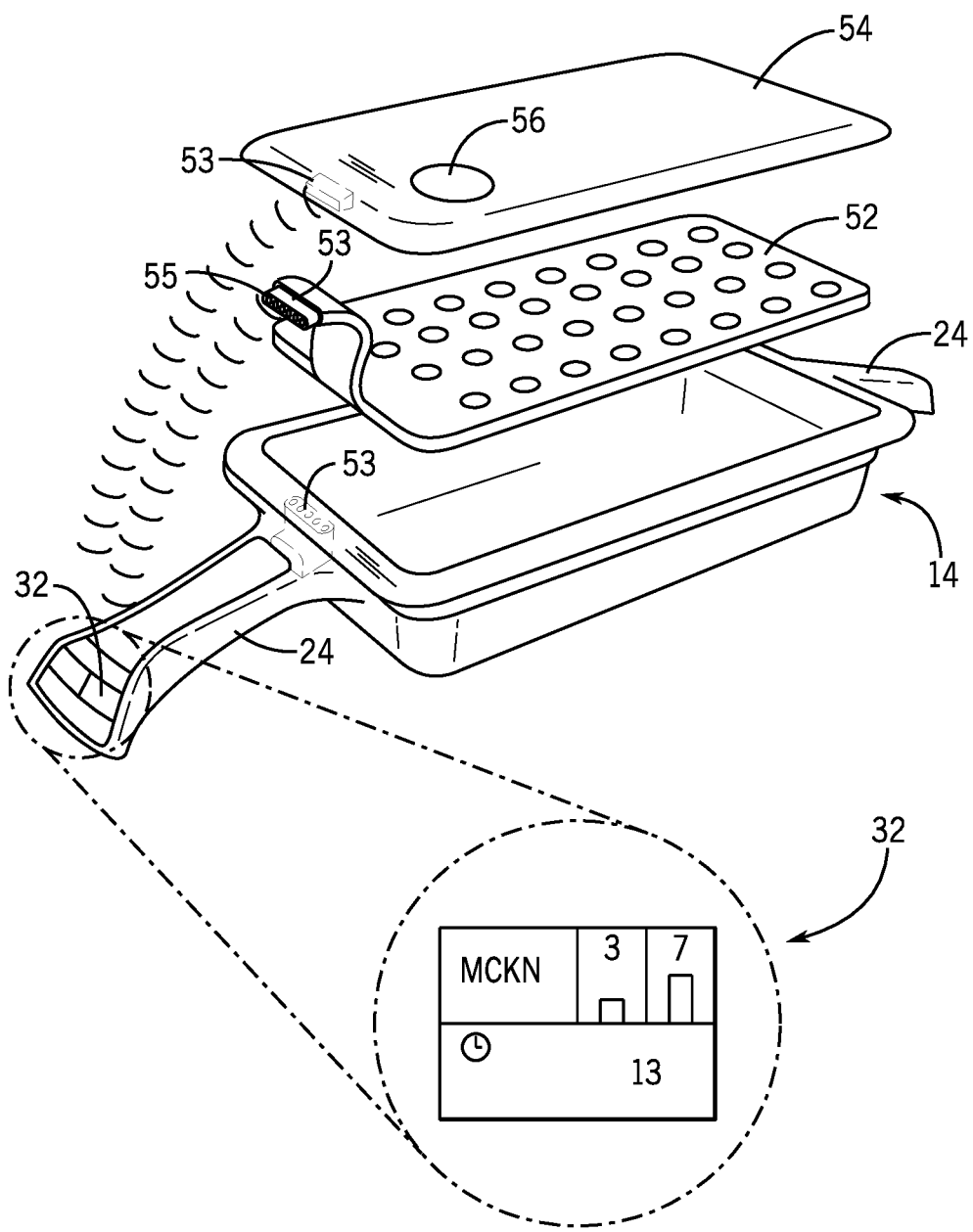
FIG. 6 depicts another exemplary embodiment of a tray.

FIG. 6 depicts a still further exemplary embodiment of a tray 14. In the embodiment of the tray 14 depicted in FIG. 6, the electronics as described above with respect to other embodiments, including a processor, are predominately located within the handle 24 of the tray 14. The tray 14 further includes a support liner 52. The liner 52 may exemplarily be made out of a silicon material. The liner 52 keeps the food off of the bottom of the tray 14 and for example out of any accumulated grease. The liner 52 may further include one or more load cells (not depicted) whereby the liner 52 can sense a change in weight attributed to the addition or the removal of a food product from the tray 14. The load cells of the liner 52 may be wired connected to the handle with an interface 53 or may communicate wirelessly with the electronics internal to the handle 24. In this manner, either alone or in combination with other sensors as has been described in further detail may be used to produce a count of the food items held within the tray 14.

Additionally, the tray 14 includes a lid 54. The lid 54 may be further communicatively connected to and controlled by a processor within the handle 24. This connection too may be through an interface 53 for a wired connection or the connection may be wireless. As previously described, embodiments of the tray 14 may monitor the environmental conditions, including, but not limited to temperature and humidity within the environment of the tray. In embodiments, the processor may provide control signals to a vent 56 in the lid 54. In response, the vent 56 opens or closes, for example by a mechanical operation help to control the temperature or humidity within the tray 14 by releasing heat and/or humidity. The lid 54, liner 52, and the electronics within the handle 24 may be communicatively connected by wired or wireless communication solutions. The power source, for example, a battery, may be stored in the handle 24 as well, which provides the power to the electronic components inside the handle 24 but also to the liner 52 and the lid 54. Additionally, the handle 24 includes a graphical display 32 whereby an identification of the food type, a count of food items in the tray 14, and a length of time that the food has been held may all be displayed. In still further exemplary embodiments, the graphical display 32 on the handle 24 may provide a change in color to visually indicate when the food product may be changed.

Figure 7:
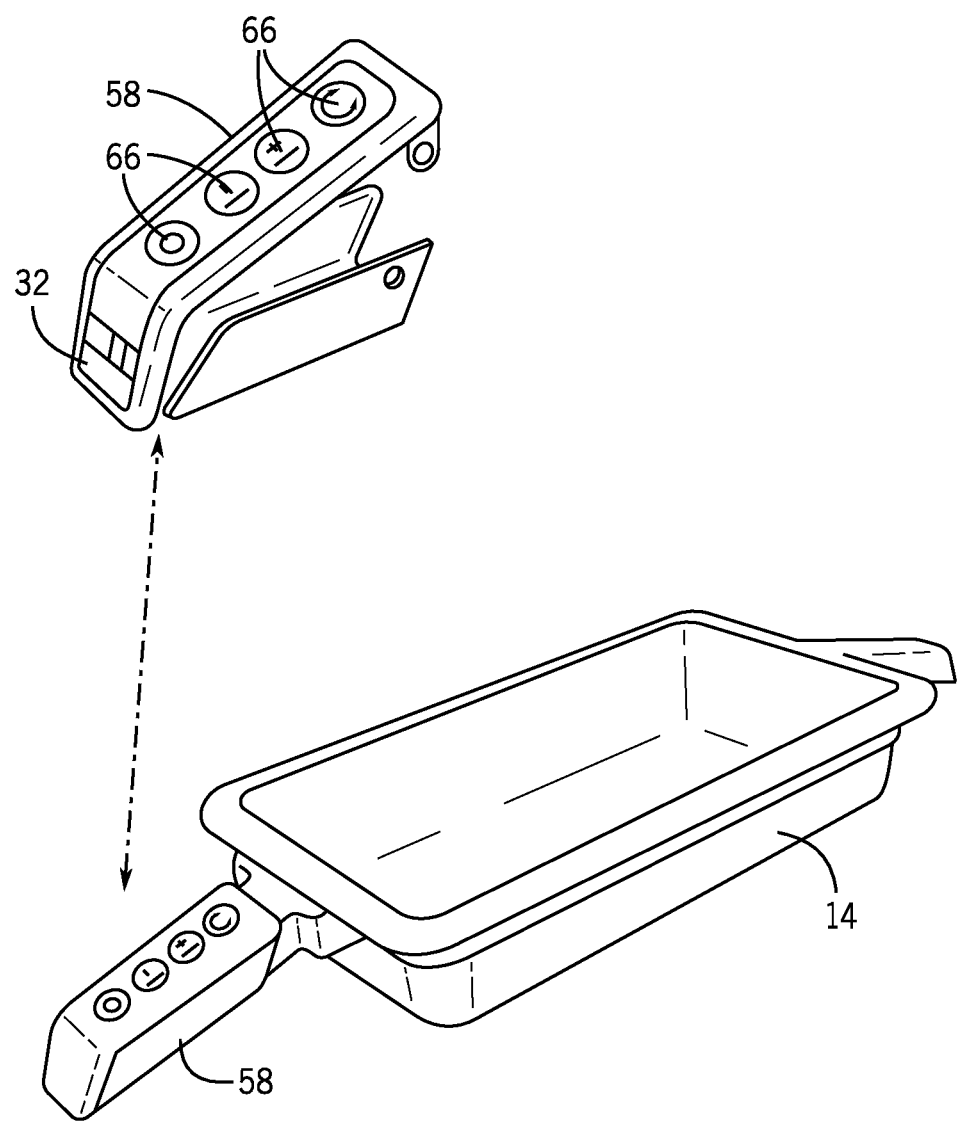
FIG. 7 depicts an exemplary embodiment of a handle for a tray.

FIG. 7 provides still further exemplary embodiments of a tray 14. In the example depicted in FIG. 10, a replaceable handle or handle housing 58 provides tracking and communication capability to a polycarbonate tray 14. The example described herein is of a handle housing 58, but it will be recognized that a similar system is disclosed that uses a replaceable handle that connects to the tray 14. The handle housing 58 may secure over an existing structural handle of the tray 14. This may be in a clamshell construction that opens to receive the end of the existing handle of the tray 14 and secure about the handle of the tray 14. The handle housing 58 includes electronics, for example as described above, to operate a graphical display 32 and a user interface exemplarily provided as a plurality of buttons 66. The buttons 66 may exemplarily provide user input to increment to decrement a count of food items within the tray, reset a holding timer or toggle through various identified food types. This provides a user interface on the tray 14 whereby the user can easily record and update a recorded condition of the tray 14. The handle housing 58 may be provided with wireless communication whereby the handle housing 58 may wirelessly communicate with the food holding chamber 12 or a KMS to provide information regarding the contents and condition of the tray 14 to further operate the food holding chambers 12 in a manner specifically suited to the contents and environmental condition of the tray 14.

In still further exemplary embodiments, the tray, through operation of a graphical display associated with the tray, can provide additional use, informational, or condition tracking features that are associated with the tray 14 and therefore may be available with the tray independent of the location of the tray within the kitchen. In an exemplary embodiment, the processor may further keep track of a length of time and/or use history associated with the tray since a previous time that the tray was cleaned and/or sanitized. Based upon this information, the processor may operate the graphical display to present a reminder and/or warning to wash the tray. Such reminder or warning may also be provided to a KMS. In still further embodiments, the tray may either sense removal of the tray from the food holding chamber, general movement of the tray, for example with an accelerometer, or removal of one or more food items from the tray, any of these events indicating that a worker is assembling a food item, for example, a sandwich. Upon sensing this event, the processor of the tray may operate the graphical display to present a reminder as to a next step or associate steps in assembling a food item so that a worker is provided with information and reminder regarding how the food product is to be used in the order assembly process.

In other embodiments, the tray 14 may be able to provide additional information and/or instructions to the food holding chamber so as to properly or more effectively hold the food product and/or remaining food product within the tray. In exemplary embodiments, this may include providing the actual temperature and/or humidity within the tray to the food holding chamber whereby the food holding chamber can adjust the operational settings relative to the actual temperature in the tray. In another embodiment, the tray either through location, or proximity sensing or by tracking changes in the environmental conditions within the tray, may determine when a tray has been out of the food holding chamber for a length of time or an excessive amount of time. This may change the required operating conditions of the food holding chamber in order to return the food to a desired holding condition. In some embodiments, this may further include shortening a total length of time that the food items may be held before they are discarded. In still further exemplary embodiments, the type of food, the length of time that the food has been held, and the number of food product items remaining within the tray may all be communicated to the food holding chambers such that that food holding chamber operation may be adjusted according to one or more of these parameters. In another exemplary embodiment, process instructions to a food service worker may be provided by the graphical display on the gray as indicated or determined by the processor of the tray. These examples may include instructions to move, stir, flip, or rotate the food within the tray. In another embodiment, the display may instruct the worker to vent or otherwise manipulate the tray itself.

In exemplary embodiments as described above, the tray 14 and the food holding chamber 12 are a part of a food service system, which may include a communicative and operative connection to a KMS as described above. In exemplary embodiments, the system can provide the features of counting food product in each of a plurality of trays, temperature or other environmental condition sensing in each of a plurality of trays, and display of a current food product count and/or sensed environmental condition within the trays. In embodiments, at least one of those functionalities of food product counting, environmental condition sensing, and information display is performed by the tray itself, for example in the manners as described above. In other embodiments, some or all of the other functionalities are provided by the tray or are provided by the food holding chamber, or through operation of the KMS. Communicative connection between the tray 14 and the food holding chamber 12 and/or the KMS provide an exchange of information for the distributed performance of the functionalities of food product counting, environmental condition sensing, and information display by the system.

In a still further exemplary embodiment, a restaurant may use a KMS to provide an inventory analysis. This inventory analysis may include a known count of received product, e.g. frozen hamburger patties and an end count of remaining product. This may be manually provided to the KMS by worker or manager. The KMS further may provide an order count of the same food product, and a kitchen efficiency may be calculated from the amount of food product used (from the inventory count) for the number of orders fulfilled for that food product. In embodiments wherein the tray 14 and/or the food holding chamber 12 provides a count of the food items held in the trays, such count can provide an intermediate value in such an inventory analysis. With an intermediate inventory value, the KMS can determine an amount of the food product loss in the handling or cooking of the food product, for example by subtracting the number of food items that are counted in the trays from the total food product used from inventory. This may be due to events or conditions of freezer burn, over or under cooking, damaged product in handling or cooking, stolen inventory, etc. With an intermediate inventory value, the KMS can also determine an amount of food product loss between the cooked held food items to the delivered orders. This may occur due to excessive hold times, errors in order assembly, improper employee recordation of the consumed food product, etc. A better understanding of where loss occurs in the food handling process can both lead to targeted improvement efforts and for better inventory management, including instructions to cook additional food product.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A food holding tray for holding prepared food comprising:
   a shell that defines at least one food receiving area internal to the shell;
   a handle extending from the shell;
   a plurality of sensors arranged about the shell and directed into the food receiving area; and
   a processor communicatively connected to the plurality of sensors to receive signals from the sensors, the processor calculates holding data from the signals received from the sensors, and provides at least one indication of the holding data.

2. The food holding tray of claim 1, wherein the holding data comprises a count of food items held within the at least one food receiving area.

3. The food holding tray of claim 2, wherein the sensors comprise at least one emitter and at least one collector of light wavelength energy, and the processor calculates the count of food items from a monitored height of food items in the at least one food receiving area.

4. The food holding tray of claim 2, wherein the at least one indication comprises a visual indication on the food holding tray and a transmission of the count of food items, the transmission broadcasted by a wireless communication device connected to the processor.

5. The food holding tray of claim 4, further comprising at least one graphical display operable by the processor to present the visual indication.

6. The food holding tray of claim 5, further comprising a user input device operable to receive an input of an identification of a type of food item within the at least one food receiving area.

7. The food holding tray of claim 2, wherein the holding data comprises environmental data of an environment of the food receiving area.

8. The food holding tray of claim 7 further comprising a wireless communication device connected to the processor and operable by the processor to broadcast the holding data.

9. The food holding tray of claim 8, further wherein the shell is an inner shell and further comprising an outer shell defining a space there between, wherein the plurality of sensors, the processor and the wireless communication device are disposed between the inner shell and the outer shell.

10. The food holding tray of claim 8, wherein the plurality of sensors, the processor and the wireless communication device are disposed interior the handle.

11. The food holding tray of claim 8, further comprising a housing securable to the handle, wherein the plurality of sensors, the processor and the wireless communication device are disposed interior the housing.

12. A system for holding prepared food, the system comprising:
   a food holding tray comprising:
      a shell that defines at least one food receiving area internal to the shell;
      a handle extending from the shell;
      a plurality of sensors arranged about the shell and directed into the food receiving area;
      a tray processor communicatively connected to the plurality of sensors to receive signals from the sensors, the tray processor calculates holding data from the signals received from the sensors, and provides at least one indication of the holding data; and a tray wireless communication device connected to the tray processor and operable by the tray processor to broadcast the holding data; and a food holding chamber comprising:
- a food holding compartment configured to receive a plurality of food holding trays;
- at least one heat source arranged relative to the food holding compartment;
- a chamber wireless communication device, operable to receive the holding data broadcast from the tray wireless communication device; and
- a chamber processor that receives the holding data from the chamber wireless communication device and controls an operation of the food holding chamber based upon the received holding data.

13. The system of claim 12, wherein the holding data comprises environment data of the food receiving area and the chamber processor operates the at least one heat source based upon the received holding data.

14. The system of claim 12, wherein the food holding chamber comprises a plurality of illumination devices arranged about the food holding compartment, and wherein the holding data comprises a count of food items in the food receiving area and the chamber processor operates the plurality of illumination devices to provide an indication of the count of food items.

15. The system of claim 12, further comprising a kitchen management system (KMS) that operates on a KMS processor communicatively connected to the food holding tray and to the food holding chamber, wherein the KMS receives the holding data from the food holding tray or the food holding chamber.

16. The system of claim 15, further comprising at least one graphical display in communication with the KMS and the graphical display operates to present the holding data.

17. The system of claim 15, wherein a location of the food holding tray is determined based upon data broadcast by the tray wireless communication device, and the KMS receives the location and tracks the location of the food holding tray.

18. The system of claim 12, further comprising:
- a loading dock arranged proximate to a cooking apparatus, the loading dock comprising a scale and a dock wireless communication device;
- wherein the food holding tray rests on the loading dock while the food holding tray is filled with food items from the cooking apparatus, and the loading dock calculates a weight of the food items and provides the calculated weight to the holding tray by broadcasting the calculated weight from the dock wireless communication device to the tray wireless communication device and the tray processor uses the weight to calculate a count of food items as holding data.

19. The system of claim 12, wherein the holding data comprises a count of food items in the food receiving area and environment data of the food receiving area.

20. The system of claim 19, wherein the food holding tray comprises a user input device operable to receive an identification of a food type received in the food holding area, and wherein the chamber processor receives the identification from the food holding tray and operates the at least one heat source based upon the identification, the count of food items, and the environment data.

* * * * *